United States Patent [19]

Taylor, Jr. et al.

[11] Patent Number: 4,963,888

[45] Date of Patent: Oct. 16, 1990

[54] SINGLE-SCAN EDITOR OF BIRD ECHOES

[75] Inventors: John W. Taylor, Jr., Baltimore; Richard A. Enstrom, Ellicott City; Antonio LoBrutto, Baltimore, all of Md.

[73] Assignee: Westinghouse Electric Corp., Pittsburgh, Pa.

[21] Appl. No.: 267,091

[22] Filed: Nov. 3, 1988

[51] Int. Cl.$^5$ ..................... G01S 13/522; G01S 13/536
[52] U.S. Cl. ........................................ 342/90; 342/105; 342/159
[58] Field of Search ................. 342/90, 105, 163, 159, 342/160, 162, 94, 115

[56] References Cited

U.S. PATENT DOCUMENTS

| | | | |
|---|---|---|---|
| 3,787,848 | 1/1974 | Laundry et al. | 342/162 |
| 3,972,041 | 7/1976 | Howard | 342/162 X |
| 4,529,985 | 7/1985 | Sawyer et al. | 342/162 |
| 4,684,950 | 8/1987 | Long | 342/94 |

Primary Examiner—Gilberto Barrón, Jr.

[57] ABSTRACT

A single-scan editor of bird echoes uses range rate to aid in identifying bird echoes. The range rate is preferably calculated from change in phase between one interpulse period to the next interpulse period and both unfiltered and MTI filtered signals are used for the calculation of change in phase. The unfiltered phase difference is used if the logarithm of the total power of the phase difference exceeds a predetermined threshold during at least one of the interpulse periods and if not, the MTI filtered phase difference is used if the total power of the MTI filtered signal exceeds a corresponding predetermined threshold. If neither threshold exceeds the corresponding threshold, no calculation is made. Due to the relationship between phase difference and range rate, several possible range rates correspond to most phase differences. Therefore, an occurrence of each of the possible range rates is counted over the course of a cycle. The cycle covered is shifted one interpulse period at a time and the largest number of occurrences of sets of range rates for all such cycles are stored during the detection of a target. These largest number of occurrences are totaled to produce a total count which is used to produce a ratio of the largest number of occurrence of each of the sets of range rates to the total count. These ratios are individually compared with a threshold. If the threshold is exceeded an indication is produced that the target has a range rate within the set of range rates corresponding to bird speeds. In this case, the radar target data is edited to prevent display.

25 Claims, 5 Drawing Sheets

SINGLE-SCAN EDITOR OF BIRD ECHOES

BACKGROUND OF THE INVENTION

1. Field of the Invention

The present invention is related to digital radar systems, and more particularly, to analysis of received signals to detect and eliminate the display of echo signals caused by birds.

2. Description of the Related Art

Radar systems used for air traffic control as well as those used for other purposes receive echo signals from many objects other than the desired targets, i.e., airplanes. There is "ground clutter" from trees, buildings and other land structures as well as echo signals from other objects in the air, particularly, from birds. In a conventional radar system, displaying targets corresponding to "bird echoes" is avoided by setting the amplitude threshold for displayed targets higher than the amplitude of signals received from birds. In addition, birds having uniform movements, such as flocks of geese, can be "edited" based upon the speed of movement from one scan to the next.

However, the conventional techniques are incapable of distinguishing between an aircraft having a small cross section and a dense group of birds. The problem is aggravated when the target has a low angle of elevation so that editing of the echo signals is performed on signals output from a Doppler filter, such as a moving target indicator (MTI), used to remove ground clutter. The signals output by a Doppler filter typically have an uneven gain versus velocity characteristic which makes the setting of the threshold virtually impossible. As a result, either bird echoes are displayed or some aircraft are not displayed, or both.

Some attempts have been made to edit bird echos using, e.g., bursts of pulses with a constant interpulse period during each burst and changes in the interpulse period from one burst to the next. However, the beam width of conventional radar is typically too small to provide a sufficient number of different interpulse periods to resolve ambiguities in range rate. As a result, it is difficult to satisfactorily distinguish the range rate of birds from the range rate of an aircraft.

SUMMARY OF THE INVENTION

An object of the present invention is to provide an indication of range rate for a received radar signal.

Another object of the present invention is to identify received signals having range rates which birds can produce.

Yet another object of the present invention is to edit radar echo signals produced by birds from signals which are displayed in a radar system.

The above objects are attained by providing a method for identifying characteristics of radar targets indicated by a received signal, comprising the steps of calculating range rates for a radar target during variation in a signal characteristic of the received signal, comparing the range rates for different values of the signal characteristics and selecting at least one of the range rates as an identifying characteristic of the radar target. Preferably, the signal characteristic is interpulse period; alternatively, it can be carrier frequency. The signal characteristic is cyclically varied, a phase difference in the received signal is calculated for two values of the signal characteristic and at least one possible range rate is determined in dependence upon the phase difference.

All calculations of the range rate may not be valid. The calculations are preferably validated in dependence upon the power of the received signal for at least one of the values of the signal characteristic used in the calculation. The validation of the phase difference is preferably made by comparing total power of the received signal with a threshold. When an unfiltered signal undergoes ground clutter filtering to produce a moving target signal, the unfiltered signal is used as a received signal if the total power in the unfiltered signal exceeds a first threshold and if not, the moving target signal is used if it exceeds a second threshold. The first threshold automatically varies to maintain a low alarm rate from ground or sea clutter.

The number of occurrences of each of several sets of range rates during a single cycle of the variation in the signal characteristic are counted. The largest number of occurrences of each set of range rates is determined by comparing occurrences during a cycle with previous cycles, each cycle differing from a preceding cycle by a single change in the signal characteristic. The largest number of occurrences of each set of range rates is totalled and a ratio between the largest number of occurrences of the sets of range rates and this total is compared with a threshold to determine whether the target likely has a range rate within the corresponding set of range rates.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENTS

There are at least two characteristics of birds which can be used to distinguish them from aircraft. Birds are smaller and generally slower than aircraft. Cross section can be estimated in a radar system as an indication of size. However, the signal characteristics, particularly amplitude, used in calculating cross section can be affected by many different factors, including beam shape, ground clutter, interference, etc. Therefore, the present invention uses velocity to supplement editing based on cross section. In a dense bird environment, it can be difficult to track a radar target from one scan to the next to determine velocity by change in position. Therefore, the present invention uses range rate measured in a single scan to edit bird echoes.

The range rate, i.e., the radial velocity or speed of a radar target towards or away from a radar antenna, can be detected in several ways. Amplitude modulation of the output of a Doppler filter with variable interpulse period is one characteristic of a received signal which can be used to determine range rate. However, the amplitude of the received signal is affected by other factors, including the shape of the radar beam in addition to the desired uneven gain versus velocity characteristics of a Doppler filter 10. If such effects on the amplitude can be eliminated or compensated, the amplitude may be used to determine range rate in a method according to the present invention.

Figure 1:
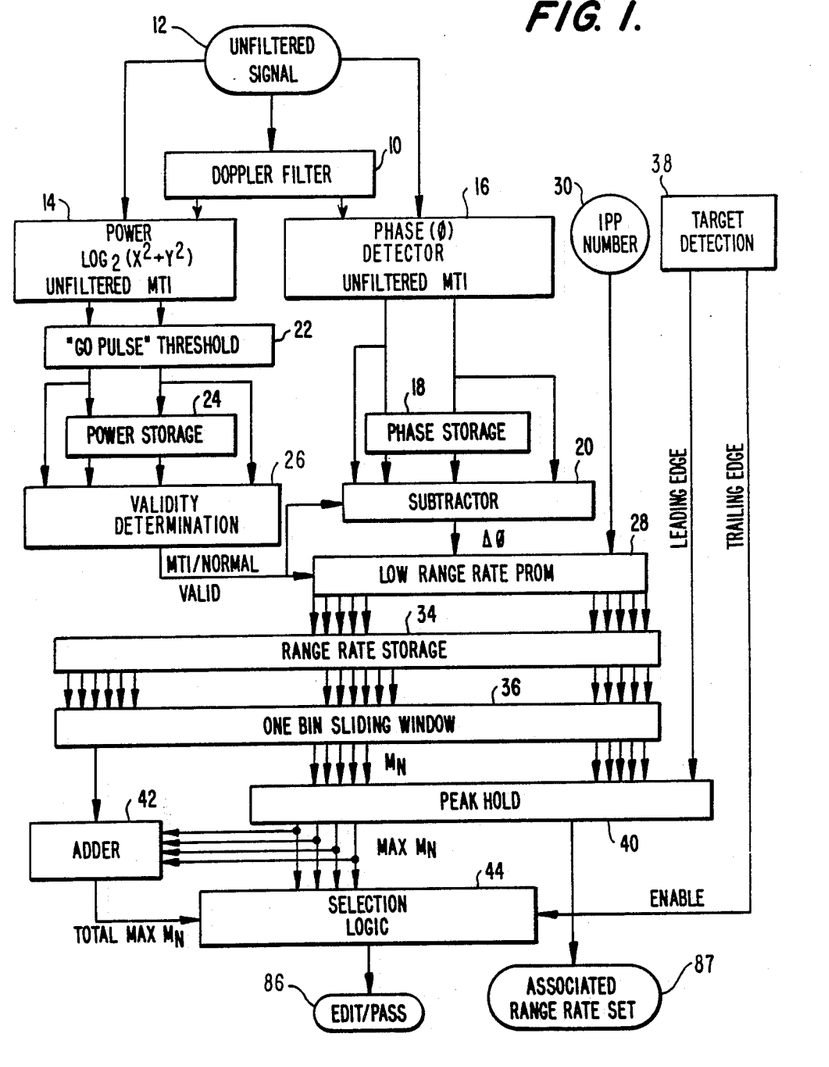
FIG. 1 is a block diagram of an embodiment of the present invention.
Figure 3A:
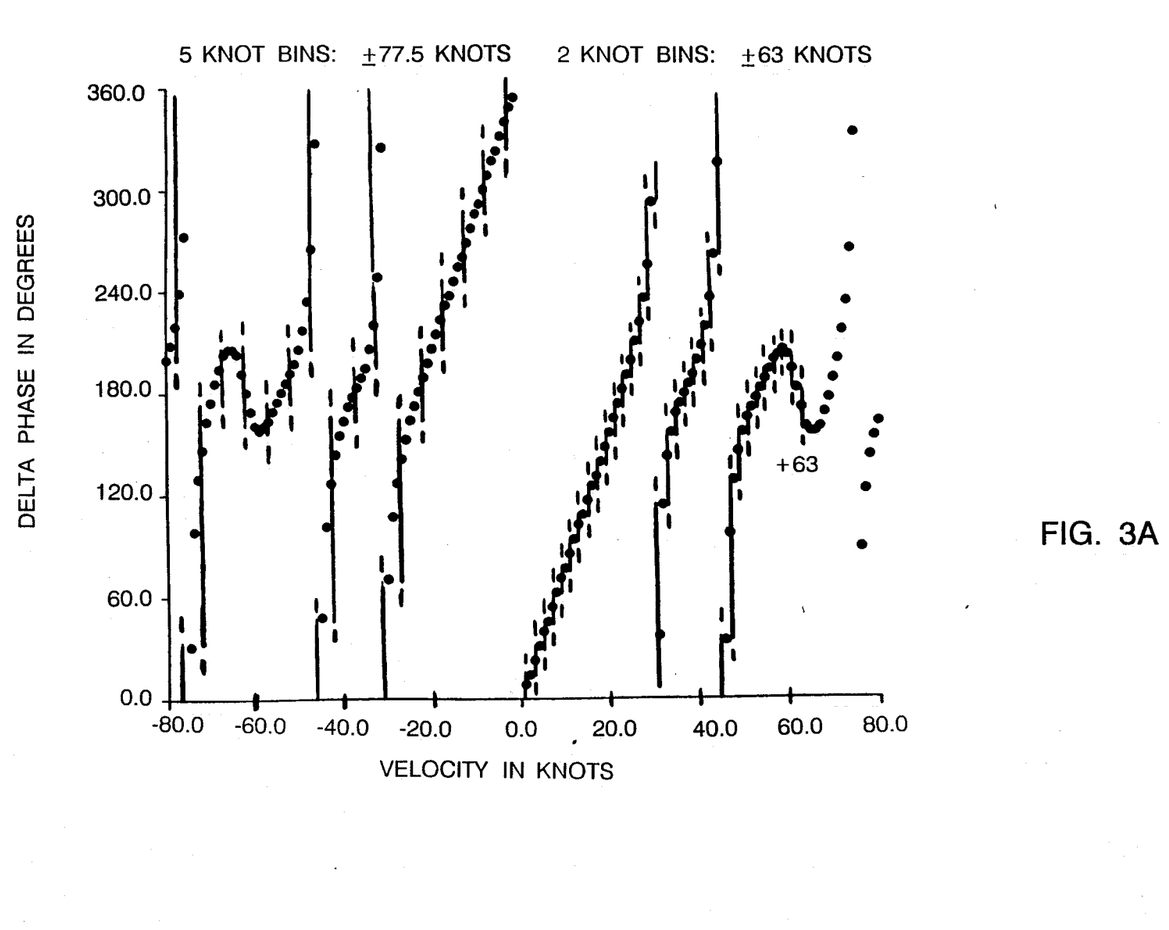
FIGS. 3A and 3B are graphical representations of phase difference versus velocity.
Figure 3B:
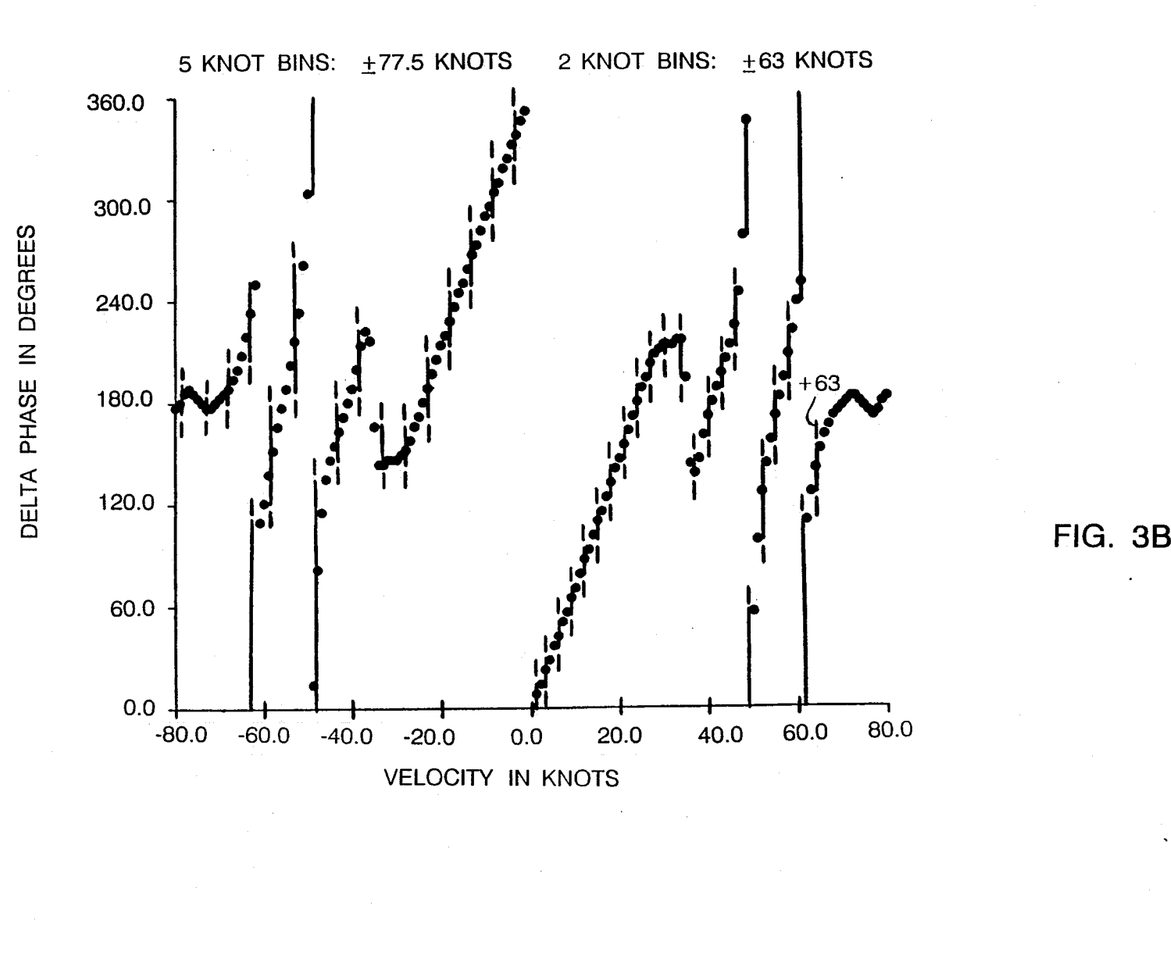

In the preferred embodiment illustrated in FIG. 1, change in phase ($\Delta\phi$) is used to determine the range rate of a radar target. As is known in the art, there is a relationship between $\Delta\phi$ and range rate for a given interpulse period. FIGS. 3A and 3B graphically depict the relationship between $\Delta\phi$ and range rate for two different interpulse periods. As illustrated in FIGS. 3A and 3B, given the change in phase ($\Delta\phi$) from one interpulse period to the next and which interpulse periods are involved, one or more velocities which produce that $\Delta\phi$ can be identified.

Modern radar systems conventionally use a Doppler filter 10 to remove ground or sea clutter. An unfiltered signal 12 from a radar target may be employed in regions free of ground and sea clutter. The term "unfiltered" is used here to indicate that the signal 12 has not passed through the Doppler filter 10 and does not suggest that no other processing has been performed on the signal received from a radar target prior to supplying the signal 12 to the Doppler filter 10. Furthermore, other types of filtering besides those used in a conventional moving target indicator (MTI) filter can be used to produce a filtered signal which will be referred to hereinafter as the MTI signal.

The Cartesian components of the unfiltered signal 12 or the MTI signal from the Doppler filter 10 are supplied to a log power combiner 14 and a phase detector 16. The log power combiner 14 may use any known method to combine the real and imaginary components of the MTI signal and the in-phase and quadrature components of the unfiltered signal 12. For example, the logarithm of $X^2$ and $Y^2$ can be calculated as described on page 5-35 of the Radar Handbook (McGraw-Hill, 1970) to produce $\log_2 X^2$ and $\log_2 Y^2$. The larger of these two values is added to a value from a table addressed by the difference $\log_2 X^2 - \log_2 Y^2$ to produce an estimate of $\log_2(X^2+Y^2)$. Preferably, phase detector 16 corresponds to the Digital Phase Detector disclosed in the U.S. Patent Application Ser. No. 07/266,195 filed Nov. 2, 1988 by one of the inventors for the present invention and assigned to the assignee of the present invention.

In FIG. 1, the power combiner 14 and phase detector 16 are illustrated as providing both an unfiltered output and an MTI output. In practice, separate units may be used to provide the unfiltered and MTI signals, or a single unit may be used by multiplexing the input.

The unfiltered and MTI outputs of the phase detector 16 are supplied to phase storage 18 and to a subtractor 20. The phase storage 18 stores indications of phase for the unfiltered and MTI signals for a preceding pulse. The subtractor 20 subtracts the indications of phase for the preceding pulse stored in the phase storage 18 from the indications of phase for the succeeding pulse, for the unfiltered and MTI signals, respectively, thereby producing phase differences for the unfiltered and MTI signals for an interpulse period.

Only one of these two phase differences is used. While it would be possible to determine which of the unfiltered MTI signals should be used prior to, e.g., supplying the signals to the phase detector 16, in the preferred embodiment, the decision of which signal to use is made simultaneously with the calculation of the phase difference. This reduces the processing time and simplifies the calculation of phase difference, but requires duplicate hardware for unfiltered and MTI channels or very fast hardware and multiplexing of the signals through the phase detector 16 and subtractor 20.

The selection of phase difference is made in dependence upon the power of the unfiltered and MTI signals in at least one of the preceding and subsequent pulses. The outputs of the power combiner 14 are supplied to a threshold circuit 22 which produces a "go pulse" if the unfiltered and MTI signals exceed predetermined thresholds, respectively. The threshold for the unfiltered signal preferably varies in dependence upon an amount of clutter expected to be present in the unfiltered signal. Typically, the amount of expected clutter is determined by a "clutter map" which relates angle of elevation and azimuth to the clutter caused by, e.g., objects on the ground. Thus, at locations where ground clutter is excessive, the threshold for the unfiltered signal will be set at a very high level so that only the MTI signal can possibly produce a go pulse. One way of implementing a constant failure alarm rate (CFAR) circuit is to use a clutter map, the output of which can be used to set the threshold for the unfiltered signal 12. A constant threshold may be used for the MTI signal since clutter has already been filtered from the MTI signal. The thresholds are preferably set moderately above noise level to provide a typical false alarm probability of around 1%.

The output of the threshold circuit 22 is supplied to "go pulse" or power indication storage 24 for storing indications of whether the power of the unfiltered and MTI signals exceeded their respective thresholds in a preceding pulse. The indications are also supplied to a circuit 26 for determining validity of $\Delta\phi$. The validity determination circuit 26 uses the indications for the preceding pulse and indications for a succeeding pulse to determine whether the power in at least one of the unfiltered and MTI signals in the preceding and the succeeding pulses exceeds the corresponding threshold. Once the indications for the preceding pulses are supplied to the validity determination circuit 26, the indication for the succeeding pulse can be stored in the "go pulse" storage 24 to be ready for the next determination of validity.

Most modern radars use four or more pulses in the Doppler filter 10. In such systems, the validity determination circuit 28 preferably selects the unfiltered phase difference as a valid indication of phase difference when the power of the unfiltered phase difference exceeds the corresponding threshold in either the preceding pulse or the succeeding pulse. If the unfiltered or normal signal is not selected, the validity determination circuit 26 selects the MTI phase difference as a valid indication of phase difference when the power of the MTI signal exceeds its threshold in either the preceding or succeeding pulses. When the Doppler filter 10 uses only two or three pulses, the validity determination circuit 26 should require that the power in both the preceding and succeeding pulse of the MTI signal exceeds the corresponding threshold.

In the preferred embodiment, the determination of validity of $\Delta\phi$ may be performed by single bit logic gates using go pulses produced by threshold circuit 22. These go pulses indicate whether the threshold is exceeded and thus, OR or AND gates can be used to implement the logic described above.

The output of the validity determination circuit 26 is a signal MTI/NORMAL which either indicates that the unfiltered phase difference should be output by the subtractor, or the MTI phase difference should be output by the subtractor, or no phase difference should be output by the subtractor. The latter situation occurs when the validity determination logic circuit 26 determines that the power of both the unfiltered and MTI signals in the preceding and succeeding pulses is insufficient to provide a valid calculation of range rate.

The selected phase difference is used as an address of range rate(s) in range rate storage 28. As indicated in FIG. 1, the MTI/NORMAL signal can be supplied to the range rate storage 28 to enable operation of the range rate storage 28 and select the appropriate phase difference input. Alternatively, the MTI/NORMAL signal can be used to select the inputs to the subtractor 20.

As indicated in FIG. 1, the range rate storage 28 preferably is a programmable read only memory (PROM) which stores only low velocities. In the preferred embodiment, each address of the range rate PROM 28 corresponds to a set of range rates covering five knots and thirty-two sets or bins are used to span velocities from −77.5 to +77.5 knots. This corresponds to the span of velocities illustrated in the left half of FIGS. 3A and 3B and is sufficient to detect most birds while including few aircraft. Alternatively, finer resolution can be provided by using 2 knot intervals as illustrated in the right half of FIGS. 3A and 3B Sixty-four bins, each corresponding to a set of range rates covering 2 knots, can be used to detect range ranges from −63 to +63 knots. This provides much better editing of birds at speeds between 30 and 60 knots, but increases the size of the PROM 28 and the amount of subsequent processing.

In FIGS. 3A and 3B, the range of $\Delta\phi$ which corresponds to a velocity bin is indicated by vertical lines. The dashes at the top and bottom of the vertical lines represent additional values of $\Delta\phi$ which are included in recognition of error created by noise. Thus, a $\Delta\phi$ of 45° produced for the 2,3 interpulse period (FIG. 3A) corresponds to not just the five velocities lying on the curves which are crossed, but will be used as an indication of the occurrence of eleven sets of range rates. In other words, the output of the range rate PROM 28 is typically not the indication of a single velocity or a single set of velocities, but rather indications that one of several, e.g., eleven, sets of range rates may have occurred, any of which could produce the phase difference which was detected by the phase detector 16

Due to the difference in the relationship between $\Delta\phi$ and velocity for different pairs of interpulse periods, as illustrated by the differences between FIGS. 3A and 3B, the range rate PROM 28 stores multiple tables for converting the phase difference into the sets of range rates. Each of the tables corresponds to a different value of the signal characteristic, i.e., to different interpulse periods. The range rate PROM 28 receives an indication of the value of the signal characteristic, such as an interpulse period number 30. The number 30 is used to select one of the tables for access by the phase difference supplied from the subtractor 20.

The large number of velocities which could generate a single phase difference has several effects on the construction of a circuit for determining a relatively unambiguous range rate. First, the output of the PROM 28 preferably includes one signal line for each set or bin of range rates. Thus, all, e.g., eleven, possible velocity bins can be indicated simultaneously by outputting a single "1" bit on the lines corresponding to the velocity bins which could have produced the phase difference input to the range rate PROM 28. Second, the velocity bins indicated by one interpulse period should be compared with other interpulse periods to reduce the number of possible velocities of the radar target.

For example, if a radar target has a range rate of approximately 52 nautical miles per hour (knots), $\Delta\phi$ for the interpulse period 2,3 will be approximately 150°, as illustrated in FIG. 3A. However, the phase difference of 150° also corresponds to seven other velocities from approximately −70 knots to approximately 80 knots, as well as other velocities outside the range rates of interest. Assuming that the range rate of the target remains approximately the same during the 4,5 interpulse period, the phase difference will be approximately 128° which corresponds to approximately four other velocities. While none of the velocities, other than 52 knots, are exactly the same in both FIGS. 3A and 3B, some of the velocities are fairly close. Other phase differences have even greater ambiguity, for example where the slope of the curve is close to 1 or 0. As a result, several interpulse periods may be required to remove at least the majority of ambiguity.

The comparison of velocities produced by different interpulse periods is accomplished in the present invention by storing in range rate storage 32 the output of the range rate PROM 28 over a cycle of the variation in the signal characteristic. In other words, during one cycle of changes in the interpulse period, all of the outputs of the range rate PROM 28 are stored in the range rate storage 32.

By using 32 bits, each corresponding to a five knot velocity bin, in a radar system having nine different interpulse periods, the range rate storage 32 may be a form of shift register with 288 bits. The 32 bits from the PROM 28 are stored in the range rate storage 34 and shifted, either physically or by changing the address to be next used for storage, in preparation for receiving the next 32 bits. A one bin sliding window 36 can be used to read the contents of the range rate storage 34. The bins corresponding to the set of range rates from −80.0 to −76.1 knots for each of the nine interpulse periods can be read simultaneously by the one bin sliding window 36. The number of "ones" stored in these bits of the range rate storage 34 identify a number of occurrences for the −80.0 to −76.1 set of range rates calculated during the preceding cycle of the variation in the signal characteristic when the bits are added together. The resulting value is represented by $M_N$ in FIG. 1.

After this calculation is completed, the one bin sliding window 36 accesses the nine bits next to the nine bits corresponding to the −77.5 to −72.6 knot bin to determine the number of occurrences of range rates in the −72.5 to −67.6 bin. This process is repeated until the number of occurrences for each of the sets of range rates calculated during one cycle of the variation in the signal characteristic have been identified. Then, the range rate storage 34 is ready to accept the possible range rates corresponding to a $\Delta\phi$ for the next pair of interpulse periods.

Targets in a radar system are identified in a conventional manner using target detection circuity 38. When the target detection circuitry 38 begins to detect a target, a leading edge signal is supplied to peak hold circuit 40 to reset the values stored therein. The peak hold circuit 40 receives the number $M_N$ of occurrences of each of the velocity bins from the one bin sliding window 36 and compares this number with a previously stored value to determine a largest number of occurrences per cycle for each set of range rates for all cycles during detection of the radar target. The outputs of the peak hold circuit 40 are continuously supplied to an adder 42 to generate a total of the largest number of occurrences for all the sets of the range rates.

When the target is no longer detected by the target detection circuitry 38, a trailing edge signal is generated to enable selection logic 44. The selection logic 44 outputs an edit indication and associated range rate set when a ratio of the largest number of occurrences of associated range rate set divided by the total output by the adder 42 exceeds a predetermined threshold. The maximum $M_N$ of each range rate set is divided by the total maximum $M_N$, one set at a time, and the resulting ratio is compared with the threshold. When the ratio exceeds the threshold, it is assumed that the associated range rate set contains the actual range rate of the target. If none of the ratios exceed the threshold, it is assumed that the target does not have a range rate within the span of range rates, e.g., −80 to 80 knots, included in the range rate PROM 28. Additional processing, taking into consideration the range rate calculated using the circuitry illustrated in FIG. 1 can be performed in a manner discussed further below.

Figure 2A:
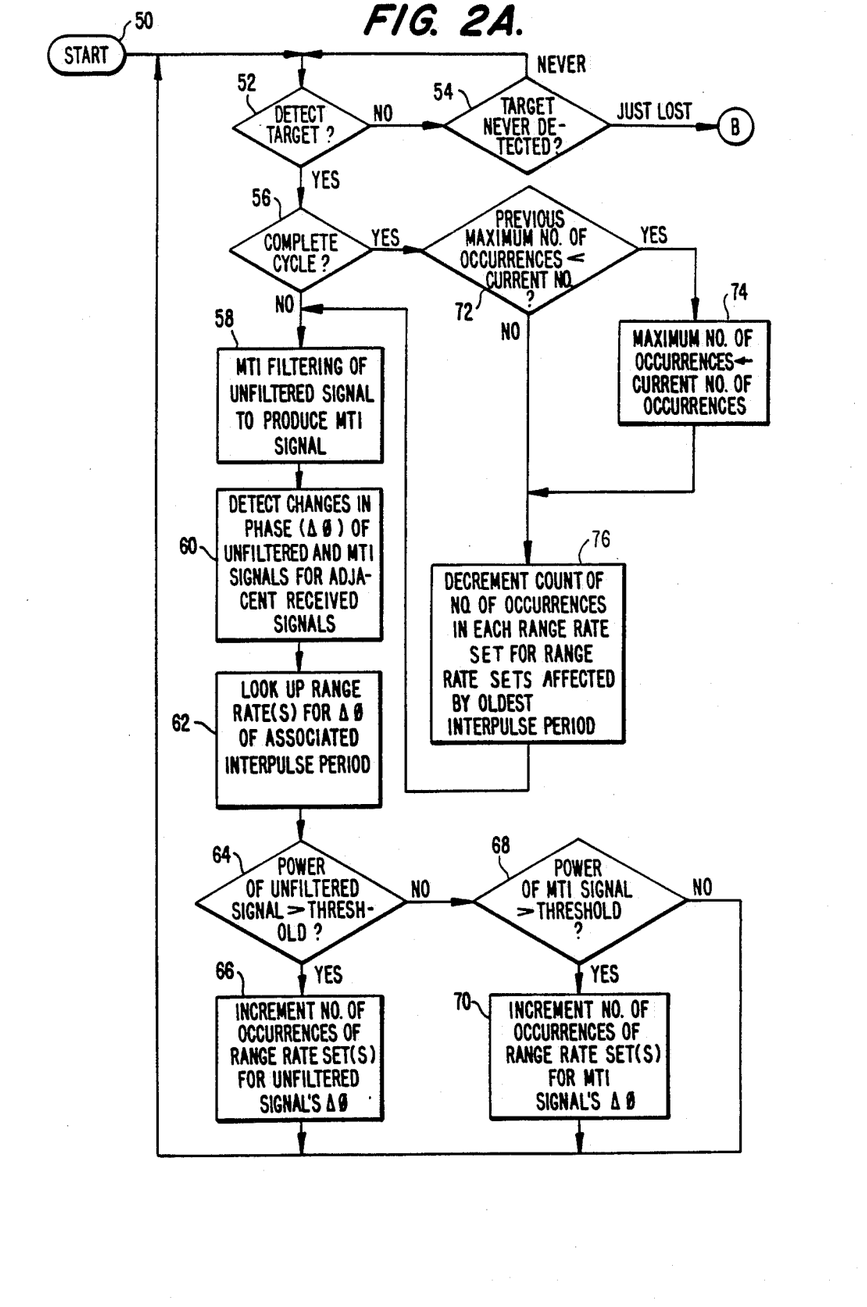
FIGS. 2A and 2B are flow charts of a method according to the present invention.

The circuitry illustrated in FIG. 1 is a preferred embodiment for calculating a reasonably unambiguous low range rate. To aid in an understanding of the invention, the general method used will be described with the aid of a flow chart illustrated in FIG. 2. The processing starts 50 with a determination of whether a target is detected. If a target is not currently detected, it is determined 54 whether a target has never been detected, or whether a target has just been lost. If the target was not previously detected, a subsequent check for detection 52 of a target is made and this loop is repeated until a target is detected.

Once a target is detected 52, it is determined whether a cycle has been completed 56. When a target has just been detected, calculation of the range rates can proceed. Doppler filtering 58 using, e.g., an MTI filter 10 is conventionally performed simultaneously with the calculation of range rate, but is indicated as being performed at block 58 for simplicity in drawing the flow chart.

The changes in phase of the unfiltered and MTI signals for adjacent received signals are calculated 60. The changes in phase ($\Delta\phi$) are used to look up 62 range rates for the value of the signal characteristics. As described above, the preferred signal characteristic is interpulse period, although carrier frequency could be used also. Validity of the range rates calculated in step 62 is determined in dependence upon the power of the received signal. If the power of the unfiltered signal is greater than a corresponding threshold in step 64, the number of occurrences of the set(s) of range rates calculated from the unfiltered signal's $\Delta\phi$ is incremented 66. If the power of the unfiltered signal is not greater than the corresponding threshold, the power of the MTI signal is compared 68 with a corresponding threshold. If the MTI signal is greater than its corresponding threshold, the number of occurrences of set(s) of the range rates calculated for the MTI signal's $\Delta\phi$ is incremented 70. If the power of neither the unfiltered or MTI signals is greater than the corresponding threshold, processing returns to determine whether the target is still detected 52.

Preferably, the logarithm of total power of the unfiltered and MTI signals is used in the comparison with the corresponding thresholds. As described above, when the Doppler filtering 58 uses four or more pulses, it is sufficient if the logarithm of the total power of the received signal for either of the values of the signal characteristic exceeds the threshold. On the other hand, if the Doppler filtering 58 uses only two or three pulses, the tests in 64 and 68 preferably use the logarithm of the total power of the received signal for both values of the signal characteristic.

After incrementing the number of occurrences of the range rates if there is sufficient power in the received signal, processing continues with the determination 52 of whether the target continues to be detected and whether a cycle has been completed 56. When the first cycle is completed, the previous maximum number of occurrences (which will be zero the first time) is compared 72 with the current number of occurrences. The first time, and all subsequent times when the current number of occurrences is larger than the previous maximum number of occurrences, the maximum number of occurrences is assigned 74 the value of the current number of occurrences.

Figure 2B:
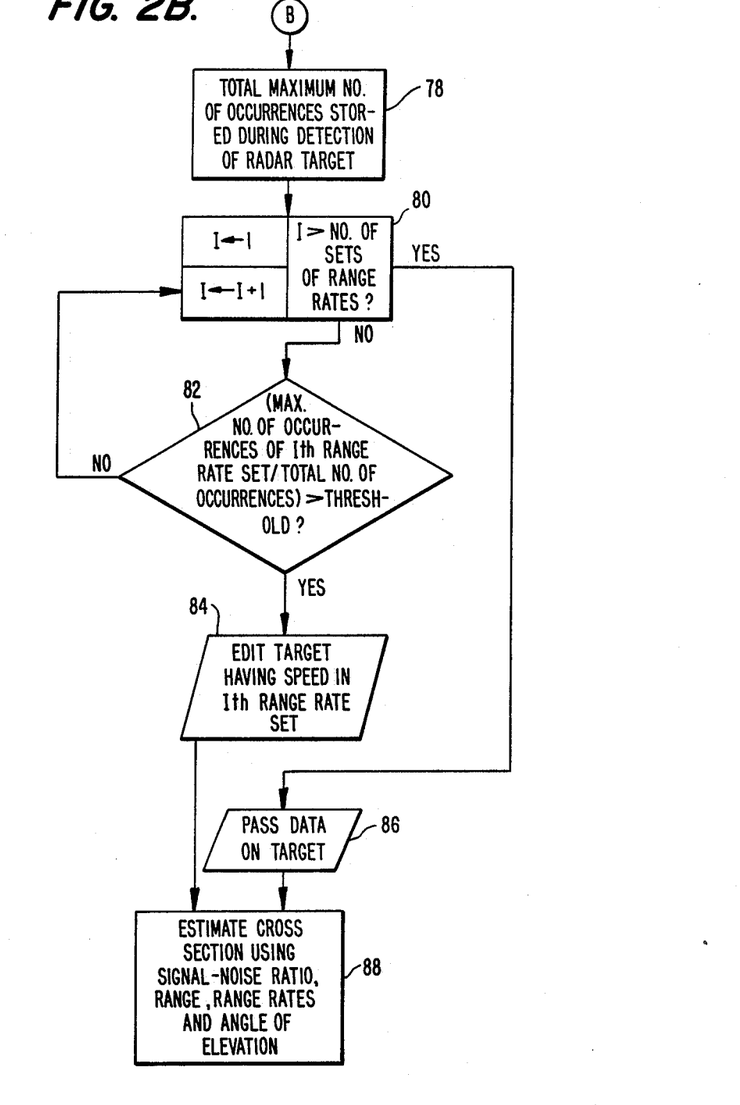

Following step 74 or step 72 if the current number of occurrences is not a new maximum, the effect of the oldest pair of interpulse periods is eliminated 76 from the current count of the number of occurrences. This may be accomplished in other ways besides the one described for the embodiment illustrated in FIG. 1. For example, a sum of the number of occurrences for the most recently completed cycle can be stored in addition to storing occurrence or nonoccurrence for the interpulse periods making up a cycle. As these bits are shifted to make room for another interpulse period, the bit shifted out can be subtracted from the sum and the bit for that velocity bin in the next interpulse period can be added to the sum as it is stored. This significantly reduces the number of bits which are added since the embodiment illustrated in FIG. 1 adds all of the bits representing a cycle every time a new interpulse period occurs, while this method adds (or subtracts) only two bits each time.

As noted above, the flow chart in FIG. 2 suggests sequential processing. However, several steps may be overlapped and, for instance, the filtering in step 58 does not wait until the count has been adjusted in step 76. Similarly, the adjustment of the count described for step 76 may occur simultaneously with the increment of the count in step 66 or 70.

When step 54 determines that the target has been lost, the maximum number of occurrences stored in step 74 for all of the velocity bins or sets of range rates is totalled 78 to produce a total range rate count. As indicated by loop block 80, the number of calculations of each set of range rates is divided by the total range rate count or maximum number of occurrences to produce a ratio. The ratio is compared 82 with a predetermined threshold and if the predetermined threshold is exceeded, an indication 84 that the target should be edited is output. If the ratio calculated for all of the sets of range rates is less than the threshold, an indication 86 is provided to pass the data on the target.

The set 87 (FIG. 1) of range rates included in the edit target indication 84 is preferably used in the estimation 88 of the cross section of the radar target. This estimation is made in dependence upon a signal-noise ratio and the range to the radar target in addition to the indicated set of range rates. The signal-noise ratio may, for example, be (signal+noise)/noise. Other factors conventionally used in calculating cross section may also be used. In addition, the elevation angle of the radar target may be used in the cross section estimation to compensate for e.g., variations in the beam shape in the vertical direction.

The range rate is particularly helpful in the cross-section estimation process by compensating for uneven gain versus velocity characteristics of the Doppler filter. As is known in the art, Doppler filters typically have dim speeds where the amplitude of a target having that range rate is reduced compared to the average signal, while at other speeds the amplitude is boosted compared to the average signal. By using the set of range rages included in the target edit indication 84, the estimate 88 of cross-section of the radar target can be made more accurately when the radar target is in a location where the MTI filter is used.

The range rate information in the target edit indication 84 can also be used to reduce the number of times the cross section is estimated. For example, in one embodiment of the present invention, the estimate of cross section is performed only when the target range rate is faster than a predetermined speed, i.e., when the pass data indication 86 is provided. In this case, the estimate is made to determine whether the radar target has a cross section smaller than a first predetermined cross section, in which case the radar target is identified as a bird, even though the range rate was not identified as having an absolute value smaller than the predetermined speed.

If the cross-section estimate is made for targets having a range rate slower than the predetermined speed, the radar target may be displayed if the cross section is not smaller than the predetermined cross section.

The many features and advantages of the present invention are apparent from the detailed specification and thus, it is intended by the appended claims to cover all such features and advantages of the method and apparatus which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to falling within the scope and spirit of the invention.

What is claimed is:

1. A method for identifying characteristics of radar targets indicated by a received signal having a varying interpulse period, comprising the steps of:
   (a) calculating possible range rates for a radar target during pulse-to-pulse variation in the interpulse period of the received signal;
   (b) comparing the possible range rates, calculated in step (a), corresponding to different pulses in the received signal;
   (c) selecting one of the possible range rates in dependence upon said comparing in step (b) to provide an indentifying characteristic of the radar target; and
   (d) providing a data pass indication as the identifying characteristic when said comparing in step (b) indicates that none of the possible range rates should be selected in step (c).

2. A method as recited in claim 1, wherein the received signal is produced from a radar beam having at least one carrier frequency and employing a sequence of interpulse periods varying while the radar beam dwells on the radar target, and
   wherein step (a) comprises:
      (a1) calculating a phase difference in the received signal for each pulse in the sequence of different interpulse periods; and
      (a2) determining the possible range rates in dependence upon the phase difference, the latest interpulse period in the sequence of different interpulse periods and the carrier frequency.

3. A method as recited in claim 2, wherein each pulse of the received signal has electromagnetic power and step (a) further comprises the step of (a3) validating the possible range rates in dependence upon the electromagnetic power of at least one pulse in the received signal employed in said calculating in step (a1).

4. A method as recited in claim 3, wherein step (a3) comprises the steps of:
   (a3i) comparing alogarithm of the electromagnetic power of each pulse of interest in the received signal with a threshold; and
   (a3ii) validating the possible range rates for corresponding pulses of interest if the logarithm of the electromagnetic power of the corresponding pulses of interest in the received signal exceeds the threshold.

5. A method as recited in claim 2, wherein an unfiltered signal is received from the radar target and the unfiltered signal undergoes at least one of ground and sea clutter filtering to produce a moving target signal, and
   wherein said method further comprises the step of (d) supplying one of the unfiltered and moving target signals as the received signal in dependence upon target location.

6. A method as recited in claim 2,
   wherein the possible range rates determined in step (a2) are separated into sets,
   wherein step (b) comprises the steps of:
      (b1) counting determinations of the possible range rates in step (a2) to produce a number of determinations for each set of the possible range rates during at least one sequence of the pulse-to-pulse variation in the interpulse period; and
      (b2) comparing the number of determinations stored in step (b1) for each set of the possible range rates,
   wherein step (d) comprises the step of providing the data pass indication as the identifying characteristic if none of the possible range rates are determined in step (a2) a predetermined number of times, and
   wherein said selecting in step (c) comprises the step of (c1) selecting one set of the possible range rates determined most often, if more often the predetermined number of times, in dependence upon said comparing in step (b2).

7. A method as recited in claim 6,
   wherein step (b) further comprises the steps of:
      (b3) comparing the number of determinations corresponding to each set of the possible range rates determined in step (a2), during a just completed sequence of the different interpulse periods with the number of determinations stored in step (b1);
      (b4) performing step (b1) for the just completed sequence of the different interpulse periods only if said comparing in step (b3) determines that the number of determinations for a corresponding set of the possible range rates is larger than the number of determinations previously stored for the corresponding set of the possible range rates, and wherein said method further comprises the step of (d) repeating steps (a), (b3) and (b4) while the radar beam dwells on the radar target.

8. A method as recited in claim 6, wherein step (c) further comprises the steps of:
(c2) adding the number of determinations stored in step (b1) for all sets of the possible range rates to produce a total range rate count; and
(c3) dividing the number of determinations of the sets of the possible range rates one set at a time, by the total range rate count to produce a ratio, and wherein step (c1) comprises selecting one range rate determined most often if the ratio calculated in step (c3) exceeds a predetermined threshold.

9. A method as recited in claim 1, further comprising the step of (e) estimating cross section of the radar target dependence upon a signal-noise ratio, range to the radar target and the at least one of the possible range rates selected in step (c) when provided as the identifying characteristic.

10. A method as recited in claim 9, wherein said estimating in step (d) further includes consideration of elevation angle of the radar target.

11. A method as recited in claim 9,
further comprising the step of (7) processing signal received from the radar target in a Doppler filter to produce the received signal, and
wherein step (e) comprises compensating for uneven gain versus velocity characteristics of the Doppler filter in dependence upon the at least one of the possible range rates.

12. A method as recited in claim 9,
wherein said selecting in step (c) is performed using only the possible range rates having an absolute value smaller than a predetermined speed, and
wherein said estimating in step (e) is performed to determine whether the radar target has a cross section larger than a predetermined cross section and a target range rate faster than the predetermined speed.

13. A method as recited in claim 12, wherein said estimating in step (e) is further performed to determine whether the target range rate is slower than the predetermined speed and the cross section of the radar target is larger than the predetermined cross section.

14. A method as recited in claim 1,
wherein said selecting in step (c) is performed using only the possible range rates having an absolute value smaller than a predetermined speed, and
wherein the identifying characteristic is used to identify the radar target as an undisplayed target when the pass data indication is not provided.

15. An apparatus for identifying characteristics of radar targets indicated by a received signal having a varying interpulse period, comprising:
calculation means for calculating possible range rates for a radar target during pulse-to-pulse variation in the interpulse period of the received signal;
comparison means for comparing the possible range rates corresponding to different pulses in the received signal;
selecting means for selecting one of the possible range rates as an identifying characteristic of the radar target; and
providing means for providing a data pass indication as the identifying characteristic when said comparison means indicates that none of the possible range rates should be selected by said selection means.

16. An apparatus as recited in claim 15, wherein the received signal is produced from a radar beam having at least one carrier frequency and employing a sequence of interpulse periods varying while the radar beam dwells on the radar target, and
wherein said calculation means comprises:
phase storage means for storing a first indication of phase of the received signal for a preceding pulse;
subtractor means for subtracting the first indication of phase for the preceding pulse from a second indication of phase for a latest pulse to produce a phase difference, said phase storage means thereafter storing the second indication of phase; and
range rate means for storing range rates in locations addressed by a difference in phase associated therewith, the interpulse period between the preceding and latest pulses and the carrier frequency, and for receiving the phase difference from said subtractor means to produce the possible range rates for the radar target.

17. An apparatus as recited in claim 16, wherein each pulse of the received signal has electromagnetic power and said calculation means further comprises validation means for validating the possible range rates output by said range rate means in dependence upon the electromagnetic power of the received signal in at least one of the preceding and latest pulses.

18. An apparatus as recited in claim 17, further comprising Doppler filter means for filtering an unfiltered signal from the radar target to remove ground clutter and to produce a moving target signal, the received signal including both the unfiltered signal and the moving target signal.

19. An apparatus as recited in claim 18,
wherein said phase storage means stores indications of phase for the unfiltered signal and the moving target signal separately and said subtractor means subtracts the unfiltered signal for the preceding pulse from the unfiltered signal for the subsequent pulse to produce an unfiltered phase difference and subtracts the moving target signal for the preceding pulse from the moving target signal for the subsequent pulse to produce a moving target phase difference, and
wherein said validation means selects the unfiltered phase difference as a valid indication of phase difference when the power of the unfiltered signal exceeds a first predetermined threshold and selects the moving target phase difference as the valid indication of phase difference when the power of the unfiltered signal does not exceed the first predetermined threshold and the power of the moving target signal exceeds a second predetermined threshold.

20. An apparatus as recited in claim 18, wherein said validation means comprises:
threshold means for comparing the unfiltered signal and the moving target signal with first and second thresholds, respectively, the first threshold varying in dependence upon an amount of clutter expected to be present in the unfiltered signal;

power storage means for storing indications of whether the power of the unfiltered and moving target signals exceeded the first and second thresholds, respectively, in a preceding pulse; and determination means for determining whether at least one of the power in the unfiltered and moving target signals in the preceding pulse and a succeeding pulse exceeds the first and second thresholds, respectively, said power storage means thereafter storing indications of the power of the unfiltered and moving target signals for the succeeding pulse.

21. An apparatus as recited in claim 15, wherein said range rate means stores multiple tables for converting the phase difference into the at least one range rate, each of the tables corresponding to one of the different interpulse periods, and wherein said range rate means receives an indication of the interpulse period between the preceding and latest pulses for selection of one of the tables.

22. An apparatus as recited in claim 15, wherein said comparison means comprises:

range rate storage means for storing indications of the possible range rates calculated by said calculation means for each adjacent pair of pulses in the received signal;

occurrence means for identifying a number of occurrences for sets of the possible range rates calculated by said calculation means during one sequence of the variation in the interpulse period of the received signal; and determination means for determining a largest number of occurrences per sequence for each set of the possible range rates for all repetitions in the sequence of the variation in the interpulse period of the received signal during detection of the radar target;

wherein said selection means comprises:

total means for totaling the largest number of occurrences, determined by said determining means, for all the sets of the possible range rates; and edit indication means for outputting an edit indication and an associated range rate set when a ratio of the largest number of occurrences of the associated range rate set divided by the total of the largest number of occurrences of all of the sets of the possible range rates exceeds a predetermined threshold.

23. An apparatus as recited in claim 22, wherein said range rate storage means stores the indications of possible range rates for each pulse of the received signal during one sequence of the variation in the interpulse period, wherein said occurrence means comprises supply means for supplying the number of occurrence for each set of the possible range rates, one set of the possible range rates at a time, together with an identification of the set of the possible range rates associated therewith, wherein said determination means comprises peak hold means for storing the largest number of occurrences per sequence of each set of the possible range rates by comparing a previously stored value with the number of occurrences supplied by said supply means, and wherein said total means totals the largest number of occurrences of all of the sets of the possible range rates stored in said peak hold means when detection of the radar target ends, to produce the total of the largest number of occurrences of all of the sets of the possible range rates.

24. A method for identifying characteristics of radar targets indicated by a received signal produced from a radar beam having a plurality of carrier frequencies, comprising the steps of:

(a) calculating possible range rates for a radar target using different carrier frequencies;

(b) comparing the possible range rates, calculated in step (a), corresponding to different carrier frequencies in the received signal;

(c) selecting one of the possible range rates in dependence upon said comparing in step (b) to provide an identifying characteristic of the radar target; and (d) providing a data pass indication as the identifying characteristic when said comparing in step (b) indicates that none of the possible range rates should be selected in step (c).

25. A method as recited in claim 24, wherein the radar beam contains pulses, each pulse including different carrier frequencies employed simultaneously, and wherein said calculating in step (a) calculates the possible range rates for the different carrier frequencies of each pulse in the received signal.

* * * * *